(12) United States Patent
Ying et al.

(10) Patent No.: US 7,136,649 B2
(45) Date of Patent: Nov. 14, 2006

(54) ENVIRONMENT AWARE MESSAGE DELIVERY

(75) Inventors: Chun Ying, Beijing (CN); Rong Yao Fu, Beijing (CN); Song Song, Beijing (CN); Wei Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 10/633,239

(22) Filed: Aug. 1, 2003

(65) Prior Publication Data

US 2004/0054803 A1    Mar. 18, 2004

(30) Foreign Application Priority Data

Aug. 23, 2002 (CN) ................. 02 1 29435

(51) Int. Cl.
*H04Q 7/20*    (2006.01)
(52) U.S. Cl. ............... 455/445; 455/417; 455/420; 455/456.5; 709/209; 709/238
(58) Field of Classification Search ............... 455/420, 455/41.2, 456.5, 456.6, 445, 417; 709/206, 709/238, 209
See application file for complete search history.

(56) References Cited

U.S. PATENT DOCUMENTS

| 6,009,333 | A | 12/1999 | Chaco |
| 6,266,513 | B1 | 7/2001 | Briancon |
| 6,356,192 | B1 | 3/2002 | Menard et al. |
| 6,438,585 | B1* | 8/2002 | Mousseau et al. .......... 709/206 |
| 6,725,045 | B1* | 4/2004 | Oren et al. ................. 455/445 |
| 2002/0004387 | A1 | 1/2002 | Newville |
| 2002/0005834 | A1 | 1/2002 | Oh |
| 2002/0006787 | A1 | 1/2002 | Darby |
| 2002/0013144 | A1 | 1/2002 | Waters et al. |
| 2002/0029258 | A1 | 3/2002 | Mousseau et al. |
| 2002/0194285 | A1* | 12/2002 | Mousseau et al. .......... 709/206 |
| 2003/0027386 | A1* | 2/2003 | Lee ........................... 438/253 |
| 2003/0134596 | A1* | 7/2003 | Zhu ............................ 455/41 |
| 2003/0134630 | A1* | 7/2003 | Scheinert et al. ........... 455/422 |
| 2004/0185877 | A1* | 9/2004 | Asthana et al. .......... 455/456.6 |
| 2004/0214550 | A1* | 10/2004 | Jenkins ....................... 455/403 |
| 2005/0054290 | A1* | 3/2005 | Logan et al. .............. 455/41.2 |

* cited by examiner

*Primary Examiner*—Danh Cong Le
(74) *Attorney, Agent, or Firm*—Louis P. Herzberg

(57) ABSTRACT

The invention provides environment aware messages delivery systems, apparatus and methods. In example embodiments the system and method automatically deliver messages to the user based on the environment around the user. In the system and method, a portable message redirection agent cooperates with a message delivery service manager in the environment to discover available message delivery service, and sets message forwarding options without the user's operation. The system and method of the invention can make full use of the existing message redirection mechanisms in more flexible manner.

11 Claims, 16 Drawing Sheets

ENVIRONMENT AWARE MESSAGE DELIVERY

FIELD OF THE INVENTION

The present invention is directed to delivering messages for users automatically. It is more specifically directed to environment aware message delivery.

BACKGROUND

The Internet has been growing dramatically into a telecommunication network over the world since 1990's. People collect plenty of information by accessing the Internet anywhere, at anytime. Meanwhile, other types of networks, such as cell phone network and pager network, are proliferating rapidly. More and more people will expect a ubiquitous network access which enables them to communicate with anyone, anywhere.

However, ubiquitous network connectivity for devices does by no means imply continuous delivery of message to anyone anywhere automatically. In fact, more and more people currently possess more than one message device, such as cell phone, home telephone, office telephones, PC and PDA. A person may be in different places from time to time during the day, switching from one message terminal to another. As a result, the person would miss an important call to his home telephone when he is in the office, and may even not get a call to his office when he is away from his desk in the office.

Message Delivery System (MDS) is a communication infrastructure destined for creation of flexible solutions of message delivery using, a wide range of known transport media. Public Switched Telephone Network (PSTN), Global System for Mobile communication (GSM), e-mail systems, and instant message systems, are all different types of MDS. To solve the above problem, MDS usually provides the necessary message redirection mechanisms so that message is delivered to the called party independent of whatever devices he uses and wherever he is. For example, call-forwarding service is provided in PSTN and GSM.

There are still some problems in current message redirection mechanisms. Let's take telephone call-forwarding as the example. Call-forwarding is a service that allows to divert incoming calls to another phone number. It offers driver options and the number towards which the calls are diverted can be a cell phone or a telephone number. The service can be used when the user is away from his phone and wants to have calls to him forwarded to a specific place. Obviously, the call-forwarding service provides many advantages, e.g. in reducing radiation from cell phone, saving the power of cell phone, saving money and bringing the user convenience, etc.

There are many methods to enable a call-forwarding service. If choosing a way of doing it manually, you have to press a series of keys on the cell phone or the telephone to set the call-forwarding option as well as call forwarding phone number. The operation is somewhat awkward for the users, especially for those users who keep roaming frequently from place to place. In addition, you have to know the forwarding phone number in advance or you will be prevented from using the call-forwarding service.

Now, it is known that some systems, e.g. SIP, provide necessary protocol mechanisms so that systems can automatically provide call-forwarding services. Such a system redirects or uses location service offered by location server to obtain information about a caller's possible location. Location server may use, for example, on-line personal calendars to determine the place where the user would possibly be reached at a certain moment actively as well as the terminal systems available at that place. However, such obtained information might not be true and accurate. For example, people may not define their own calendar at all, or, maybe at some event that could not be anticipated. Besides, the location information could not fully express the information nearby the user's environment. Examples of such environment information include nearby devices' capabilities, available services, and so on. The information is also dynamic along with user's mobility from a location to another location frequently.

SUMMARY OF THE INVENTION

Therefore, the present invention provides an environment aware message delivery system and method. The system and method provide a capability of automatic message delivery services based on a users' environment. According to the present invention, a message redirection agent cooperates with a message delivery service manager located in the environment around the user, to discover the message services available in the environment and to set message forwarding options automatically in the background without a user's operation.

According to an aspect of the invention, an environment aware message delivery system is provided to deliver message automatically for users. An example of the system comprises a portable message redirection agent carried by a user and a message delivery service manager for managing candidate message terminals to provide message delivery services for the user, wherein when the user moves over to a place, said message redirection agent and said message delivery service manager in the environment around the user co-operate to select a message terminal from the candidate message terminals in the environment as a target message terminal, and request a message redirection entity to redirect the message addressed to the user to said target message terminal.

According to another aspect of the present invention, an example embodiment of an environment aware message delivery method is provided to deliver message automatically for users, comprising the following steps: making information interaction with a message deliver service manager located in the environment around a user by a portable message redirection agent carried by the user, wherein the interacted information includes the information on available candidate message terminals; selecting a message terminal from said candidate message terminals in the environment as a target message terminal; and, requesting a message redirection entity to redirect the message addressed to the user to said target message terminal.

According to the present invention, the environment aware message delivery system and method deliver message automatically for users without the users' manual operation. The system and method of the invention are based on more accurate and richer local message delivery devices information than other methods such as location database, calendar, etc.

BRIEF DESCRIPTION OF THE DRAWINGS

These and other advantages, purposes and features of the present invention will become more explicit in connection with the description of the advantageous embodiments with reference to the drawings in which.

DESCRIPTION OF THE INVENTION

Figure 1:
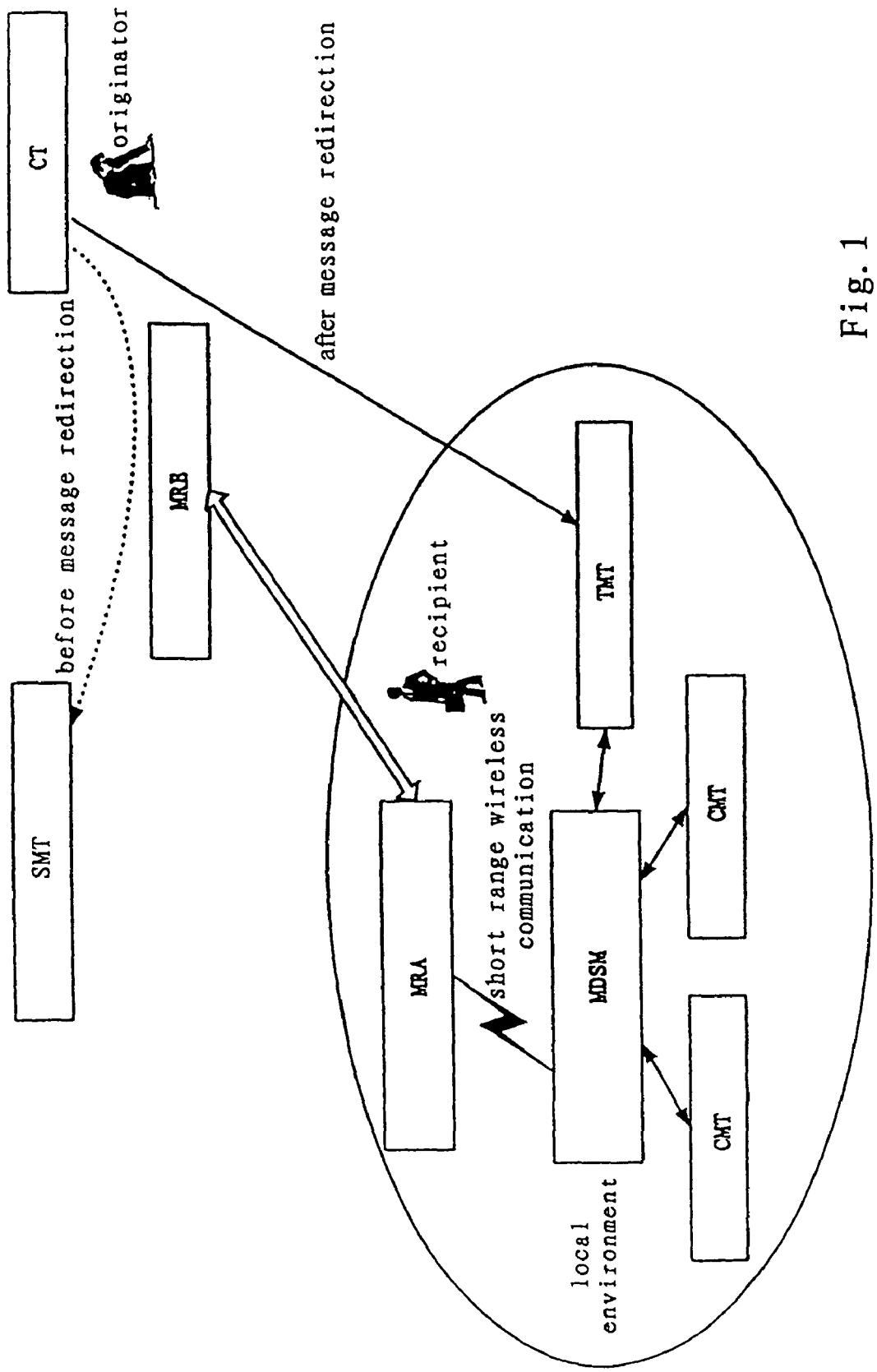
FIG. 1 illustrates a first example embodiment of the environment aware message delivery system according to the present invention.

The present invention provides environment aware message delivery systems, apparatus and methods. The systems and methods provide a capability of automatic message delivery services based on a users environment. A message redirection agent cooperates with a message delivery service manager located in the environment around the user, to discover the message services available in the environment, and to set message forwarding options automatically in the background without a user's operation. The present system and method make full use of the existing message redirection mechanisms in more flexible manners.

An environment aware message delivery system is provided to deliver message automatically for users. In an example embodiment, the system comprises a portable message redirection agent carried by a user, and a message delivery service manager for managing candidate message terminals to provide message delivery services for the user. When the user moves to a new place, the message redirection agent and the message delivery service manager, in the environment around the user, co-operate to select a message terminal from the candidate message terminals in the environment as a target message terminal, and request a message redirection entity to redirect the message addressed to the user to said target message terminal.

An example of an environment aware message delivery method is provided to deliver message automatically for users. The method comprising the following steps: making information interaction with a message deliver service manager located in the environment around a user by a portable message redirection agent carried by the user, wherein the interacted information includes the information on available candidate message terminals; selecting a message terminal from said candidate message terminals in the environment as a target message terminal; and, requesting a message redirection entity to redirect the message addressed to the user to said target message terminal.

According to the present invention, the environment aware message delivery system and method deliver message automatically for users without the users' operation manually. The system and method of the invention are based on more accurate and richer local message delivery devices information than other methods such as location database, calendar, etc.

Advantageous embodiments of the invention are described with reference to the attached drawings as follows. For the sake of completeness, technical terms as well as some abbreviations adopted in the description are explained first, as follows:

Message: any voice or literal, verbal or written contents sent from one entity to another;

Originator: the calling user who wishes to communicate with others;

Recipient: the callee whom the originator would like to be ultimately connected to;

Message Redirection Entity (MRE): the functional entity that provides the message redirection capability, which can be, e.g. the Mobile Switch Center (MSC) or Private Branch eXchange (PBX), etc.

Served Message Terminal (SMT): the terminal to which the message redirection service is provided; the message sent to the served message terminal should be handled by the message redirection entity;

Target Message Terminal (TMT): the terminal to which the message is redirected as a result of redirection, which can be, e.g., a home telephone, an office telephone, or a cell phone, voice mailbox, etc.;

Caller Terminal (CT): the original message terminal in a communication that is subject to redirection;

Message Redirection Agent (MRA): the agent that discovers the available call-forwarding services in local environment and optionally may set call-forwarding options on behalf of the associated served phone terminal;

Message Delivery Services Manager (MDSM): the service manager that provides the available message delivery services to the nearby users; and Candidate Message Terminal (CMT): the terminal that is managed by the message delivery services manager.

A first embodiment of an environment aware message delivery system of the invention is shown in FIG. 1. The system comprises a portable message redirection agent MRA carried by a user and a message delivery services manager MDSM for managing the candidate message terminals CMTs to provide the user with message delivery services. To better understand the processing of the system, a message redirection entity MRE providing the message redirection capability, a plurality of candidate message terminals CMTs located surrounding the environment and a short range wireless communication network are also illustrated in FIG. 1.

While in an advantageous embodiment of the invention the portable message redirection agent MRA carried by the user cooperates with the message delivery services manager MDSM in the local environment through the short range wireless communication network, it is obvious to those skilled in the art that other communication links, e.g. USB interface, may be adopted for the cooperation between the portable message redirection agent MRA and the message delivery services manager MDSM.

In the embodiment shown in FIG. 1, MRE can be any entity that provides message redirection capability, for example MSC or PBX or the like. Depending on the type of message, the CMT may be cell phones, telephones, PDA, personal computers PCs, facsimile machines, printers and so on. The short range wireless communication network may be Bluetooth, IrDA and so on. As shown in FIG. 1, the message from the caller terminal CT is sent directly to the serviced message terminal SMT before the message redirection is conducted. By using the message automatically delivery system of the present invention, the message redirection agent MRA carried by the user cooperates with the message delivery services manager MDSM in local environment through the short range wireless network, when he/she moves over to a place, selects a message terminal from the candidate message terminals (CMTs) in the local environment as a target message terminal TMT and requests the message redirection entity MRE to redirect the message addressed to the user to the target message terminal TMT. In the system shown in FIG. 1, every MRA is associated with a SMT and the MDSM manages more than one CMTs. The composition of the MRA and the MDSM will be described in detail with reference to the drawings.

Figure 2:
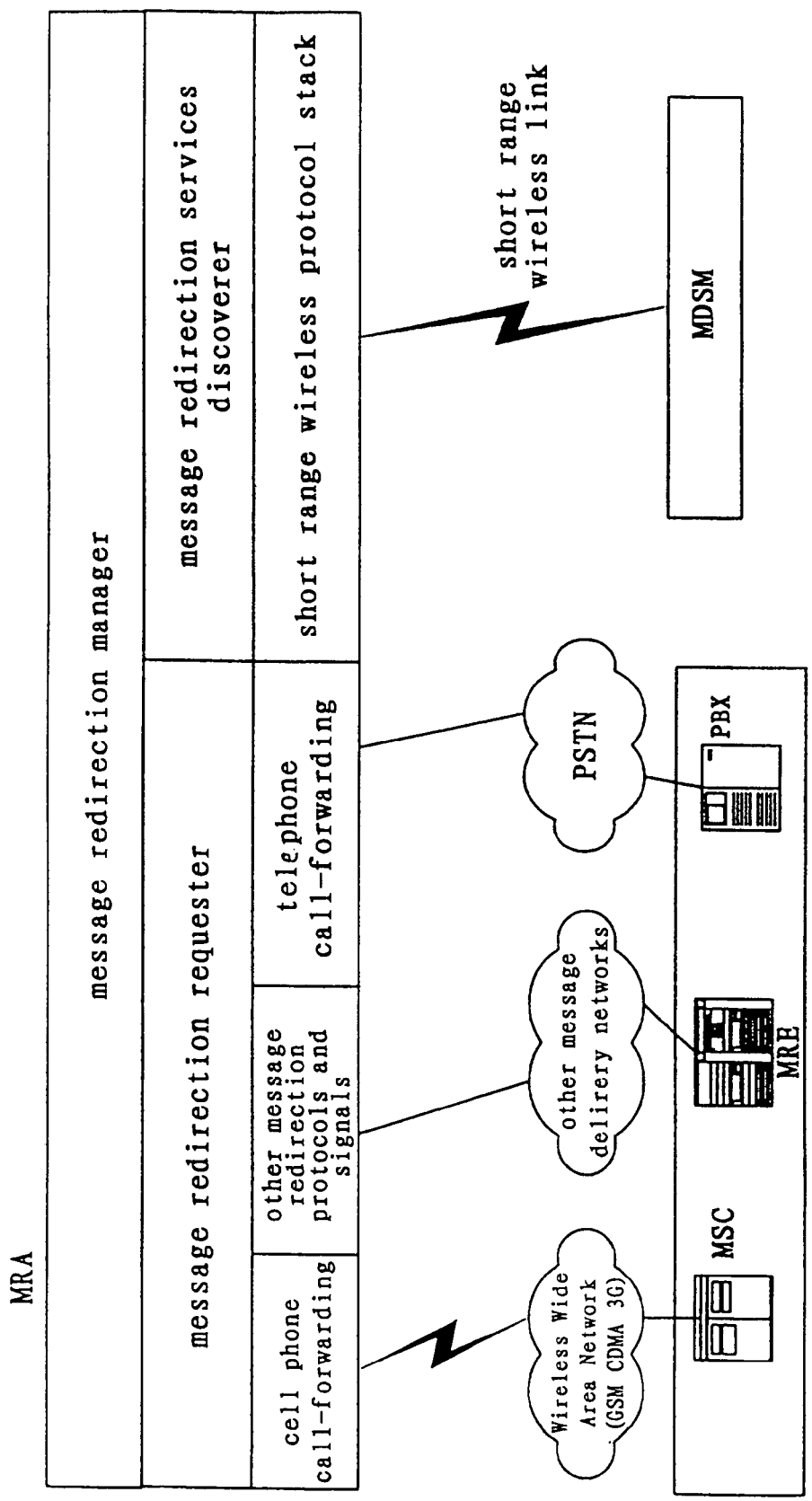
FIG. 2 illustrates an example of the message redirection agent (MRA) of FIG. 1.

As shown in FIG. 2, the MRA is composed of message redirection services discoverer, message redirection manager and message redirection requester. Wherein the message redirection services discoverer is responsible for soliciting MDSM on demand and receiving the message delivery services information from the MDSM.

The message redirection manager is responsible for managing and maintaining a message redirection service list, configuring the message redirection policy and selecting the target message terminal. Each entry in the service list might contain two fields: the target message terminal ID and the message delivery services manager ID. MRA will update the message redirection service list according to the received service information. When the wireless link from the MRA to MDSM A is broken, all entries whose message delivery service manager ID field is equal to A will be deleted from the service list.

Users could prearrange some special rules to provide more flexibility. For example, the user might prefer to choose particularly some phones as target message terminals and the message redirection agent would give a higher priority to these chosen phone numbers. In addition, the target message terminal may be determined also in accordance with the type of the message or the situation of the candidate message terminals in the local environment. The message redirection requester is responsible for requesting message redirection service from the message redirection entity. The operation can be done according to the service specification for the related message system. For example, for GSM cell phones engaged with China Mobile, there are four call-forwarding options, which are depicted in Table 1.

TABLE 1

| Call-forwarding options | Operation | Press |
|---|---|---|
| Phone off/out of range | Activate | **62*<phone_number>#Send |
|  | Cancel | ##62# |
|  | Check status | *#62# |
| Ring no answer | Activate | **61<phone_number>#Send |
|  | Cancel | ##61# |
|  | Check status | *#61# |
| Phone busy | Activate | **67<phone_number>#Send |
|  | Cancel | ##67# |
|  | Check status | *#67# |
| Unconditional | Activate | **21<phone_number>#Send |
|  | Cancel | ##21# |
|  | Check status | *#21# |

The message redirection requester commands the associated served message terminal SMT to send a series of key operations to complete the call-forwarding task. For telephones, the call-forwarding instruction and signals of one PBX are different from that of the others, and the PBXs will be treated individually by the message redirection requester.

Figure 3:
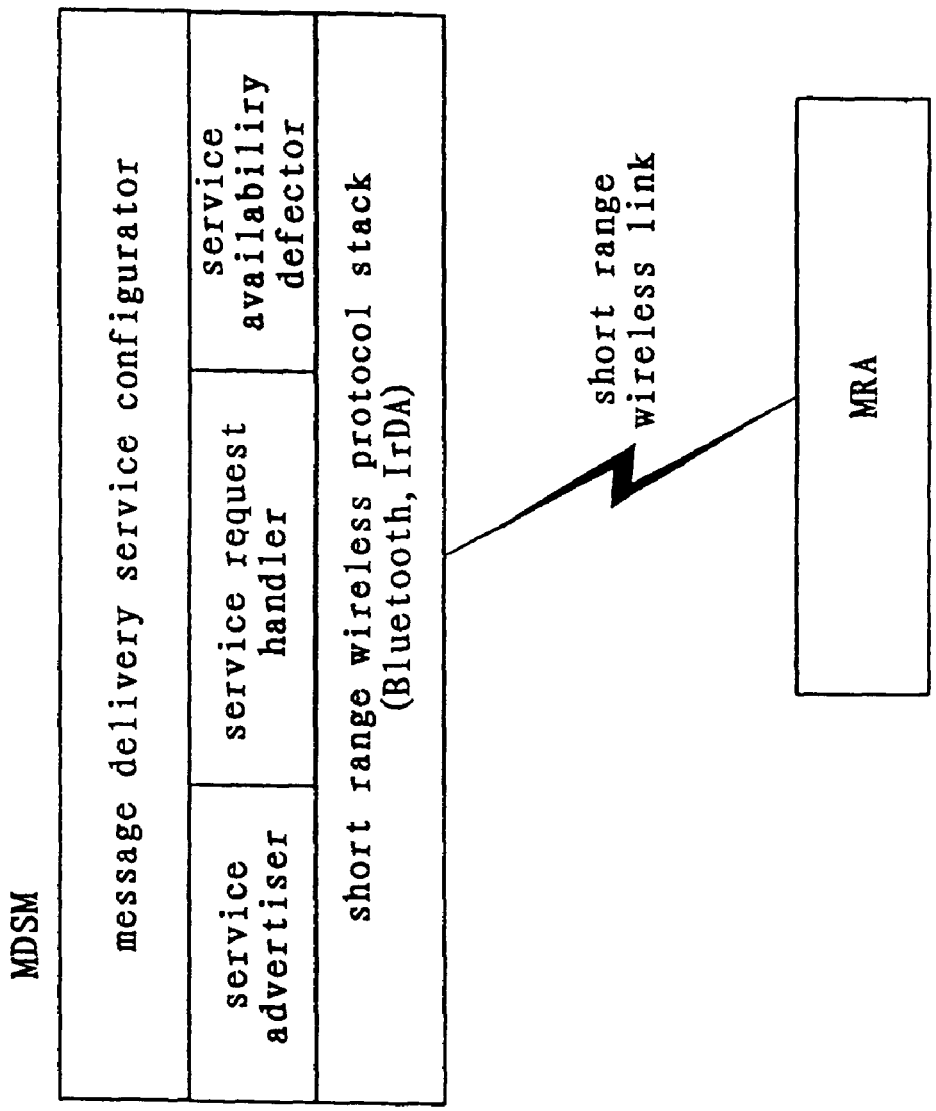
FIG. 3 illustrates an example of the message delivery services manager (MDSM) of FIG. 1.

The components of the message delivery services manager MDSM of FIG. 1 are described with reference to FIG. 3 as follows. In the system as shown in FIG. 1, the MDSM that manages a plurality of CMTs is composed of a service request handler, a service availability detector, a message delivery service configurator, as well as a service advertiser. The service request handler is responsible for authenticating the MRAs, sending on-demand service information to the requesting MRAs. The service availability detector is responsible for detecting the status of the message terminals (including the target message terminal TMT and candidate message terminals CMTs) managed by the MDSM and for updating the message delivery service list according to the status of these terminals. The message delivery service configurator is responsible for configuring the available message delivery services, authorizing which MRA can access these services. The service advertiser is responsible for periodically sending service information to nearby MRAs. The information includes the capabilities of available message redirection devices, available message redirection services, the address of the manager and so on. As well-known to the technicians in the art, the service advertiser is optional with respect to the system of FIG. 1.

Figure 4:
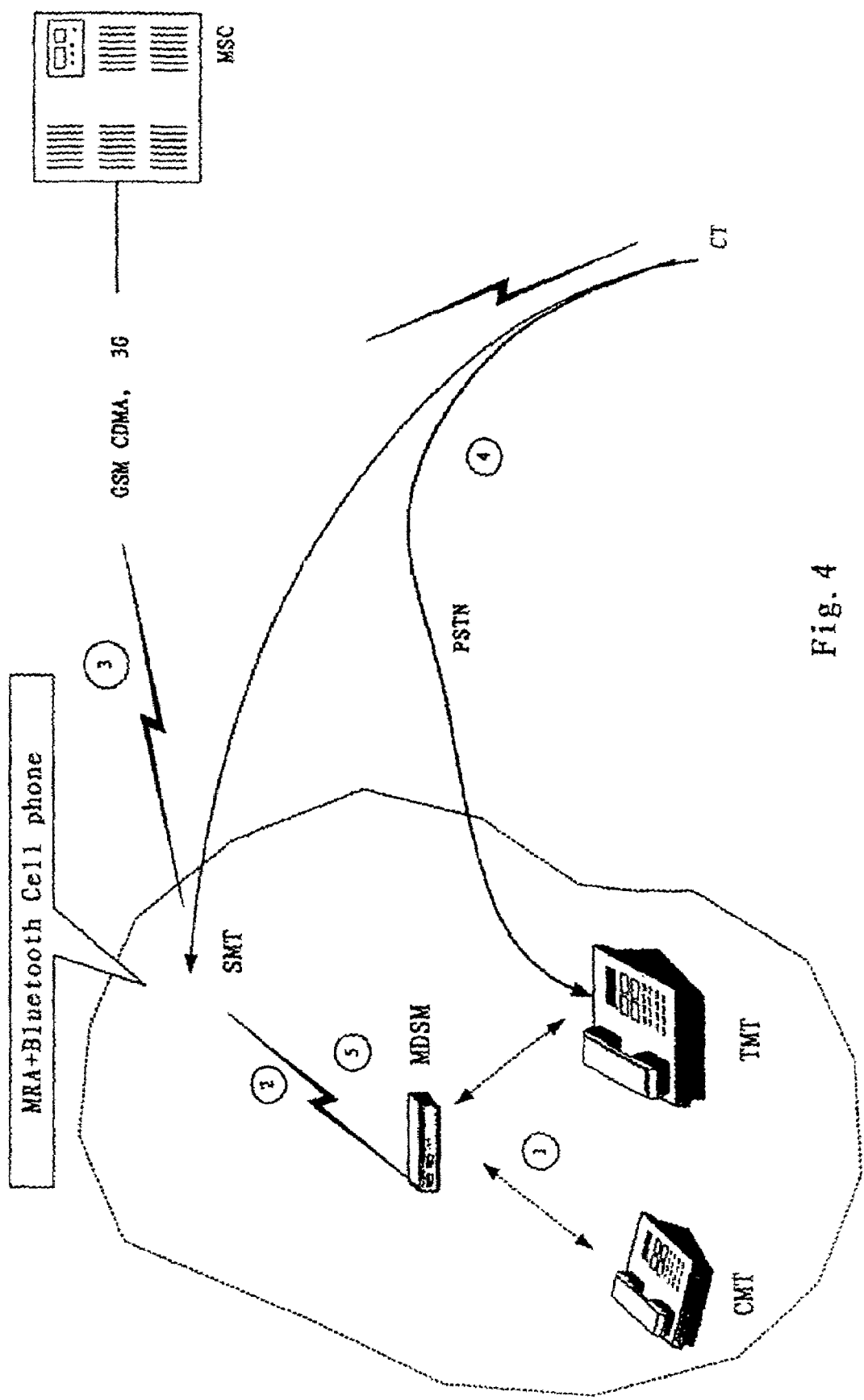
FIG. 4 shows an example of the environment aware message delivery system for delivering message automatically for users of cell phones based on the system shown in FIG. 1.
Figure 5:
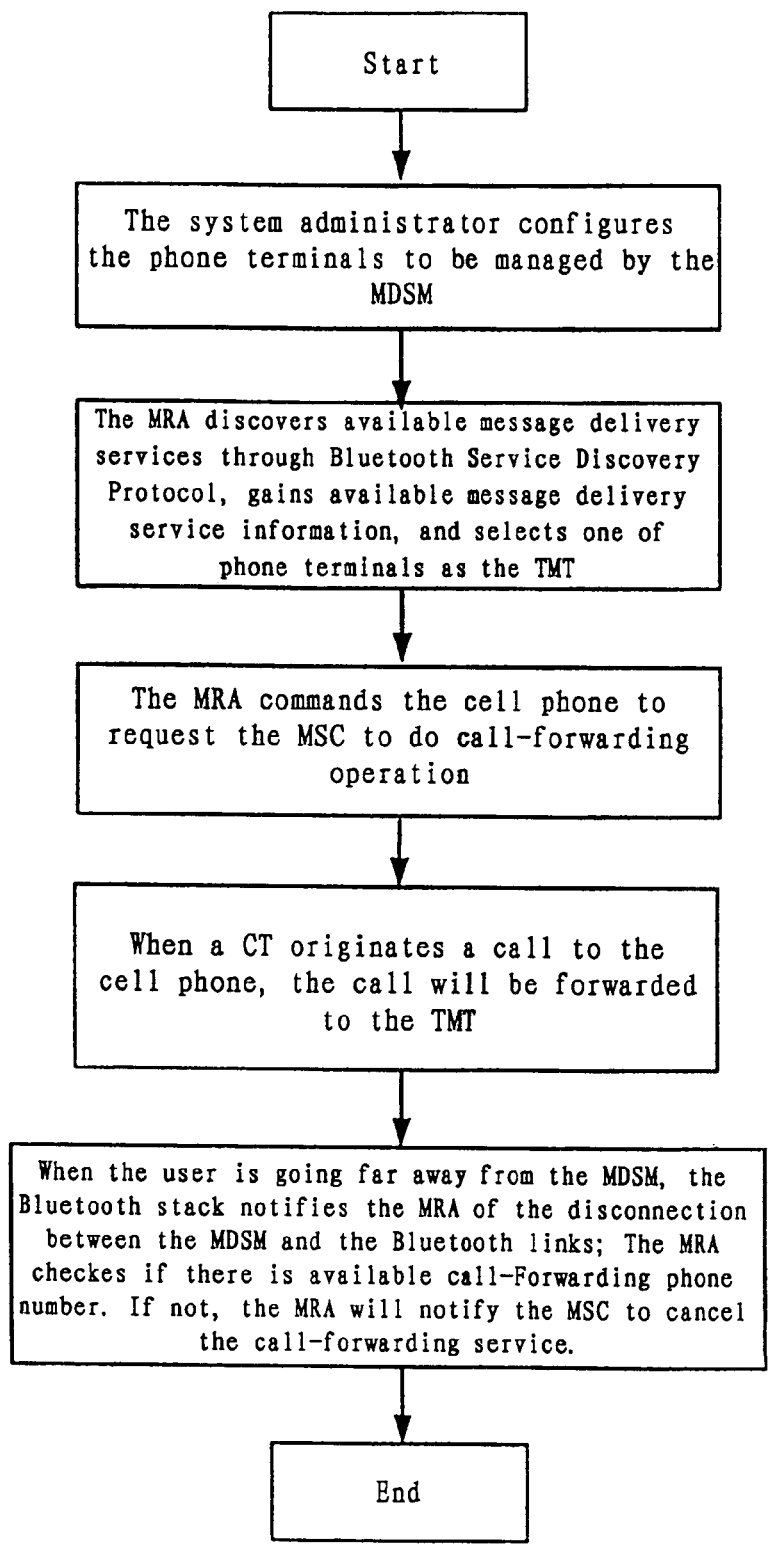
FIG. 5 is a chart of the processing steps of the environment aware message system of FIG. 4 for delivering message automatically for users according to the present invention.

Taking the call-forwarding of cell phones and telephones respectively as examples, an implementation of the system of FIG. 1 is presented herewith. As an example, FIG. 4 illustrates an implementation of the system of FIG. 1 with regard to cell phone call-forwarding. In this example, a user with a cell phone is roaming around different places. In the implementation shown in FIG. 4, the MRA runs in the cell phone or PAD. Subsequently, the discussion will be addressed to review how the environment aware message delivery system according to the first embodiment of the present invention works. The processing steps of the system are shown in FIG. 5.

In Step 1: the system administrator configures the phone terminals to be managed by the MDSM and sets the control policy to define the users, priorities and so on.

In Step 2: when the user is close to the MDSM, the MRA running in the cell phone or PDA discovers the message delivery services available in local environment through Bluetooth Service Discovery Protocol. After the user is authenticated, the MRA gains the information of available message delivery services such as call-forwarding phone numbers. A phone terminal is selected as the target message terminal TMT based on the user's preference.

In Step 3: the MRA commands the cell phone to request the MSC to do call-forwarding operation.

In Step 4: when a caller terminal CT originates a call to the cell phone, the call will be forwarded to the target message terminal TMT.

In Step 5: when the user is going far away from the MDSM, the Bluetooth stack notifies the MRA that the Bluetooth link with the MDSM is lost. The MRA checks if there is available call-forwarding phone numbers. If not, the MRA will communicate the MSC to cancel the call-forwarding service.

Figure 6:
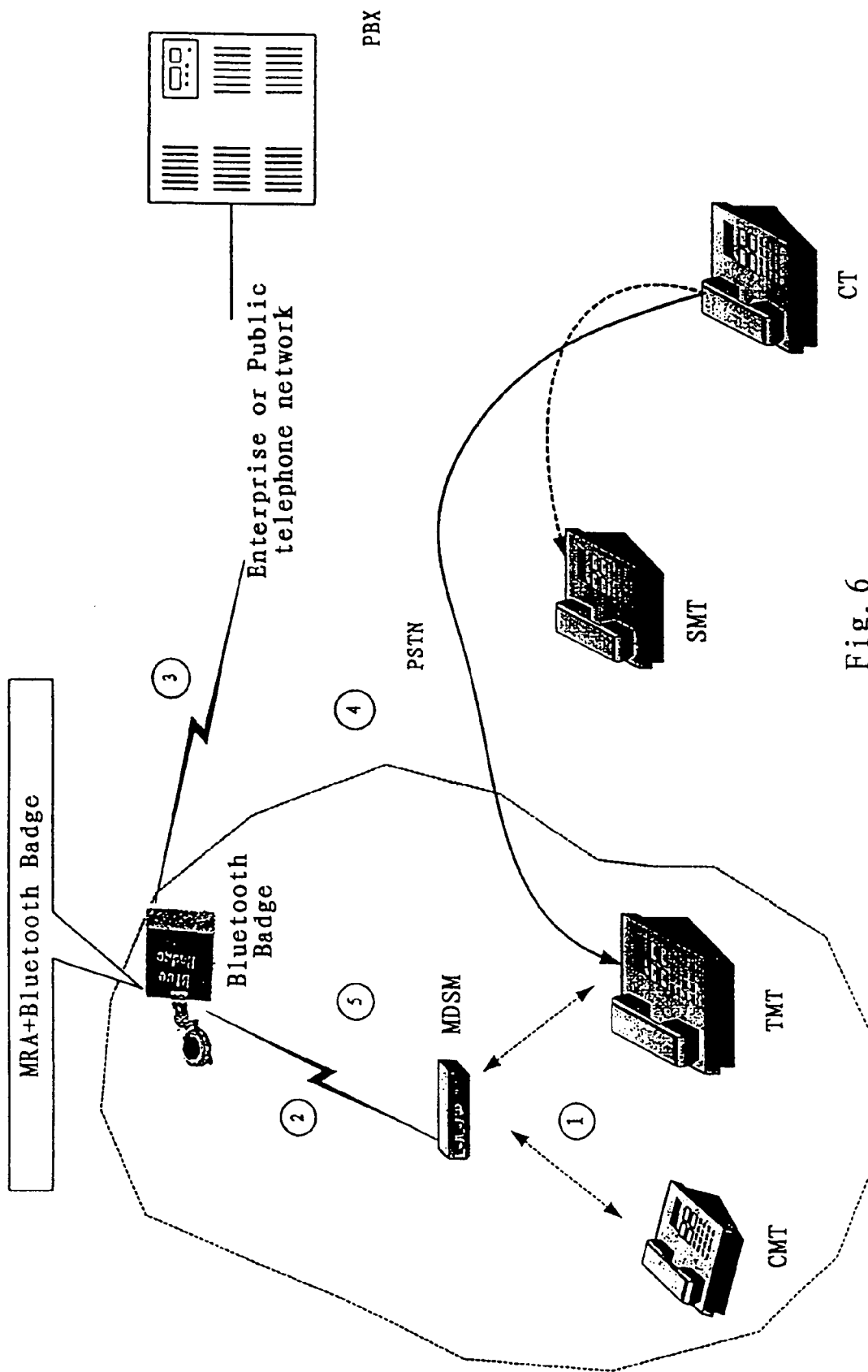
FIG. 6 shows an example of the system for automatically delivering message for the users of telephones based on the system of FIG. 1.

As another example, FIG. 6 illustrates an implementation of the system of FIG. 1 with regard to telephone call-forwarding condition. The differences between the implementation of FIG. 6 and that of FIG. 4 lie in two points. One is that the MRA is running in a Bluetooth enabled badge carried by the user. Another is that the message redirection entity is PBX which is requested by the MRA to redirect all calls that are being addressed to the user to the target message terminal TMT.

The environment aware message delivery system according to the first embodiment of the present invention, the implementation with regard to cell phones and telephones, and the processing steps of the system have been described above in detail with reference to FIG. 1 to FIG. 6. It is obvious that FIG. 5 also provides a flowchart of an embodiment of an environment aware message delivery method for automatically delivering message for users according to the present invention.

According to the circumstances that whether or not the message delivery service manager MDSM is shared by a plurality of candidate message terminals in the surrounding environment, and whether the request for message redirection service is made by the message redirection agent MRA to the message redirection entity MRE or it is made by the message delivery service manager MDSM to the message redirection entity, there are some alternative embodiments for the present invention. The followings are brief introductions of some of such alternative embodiments.

Figure 7:
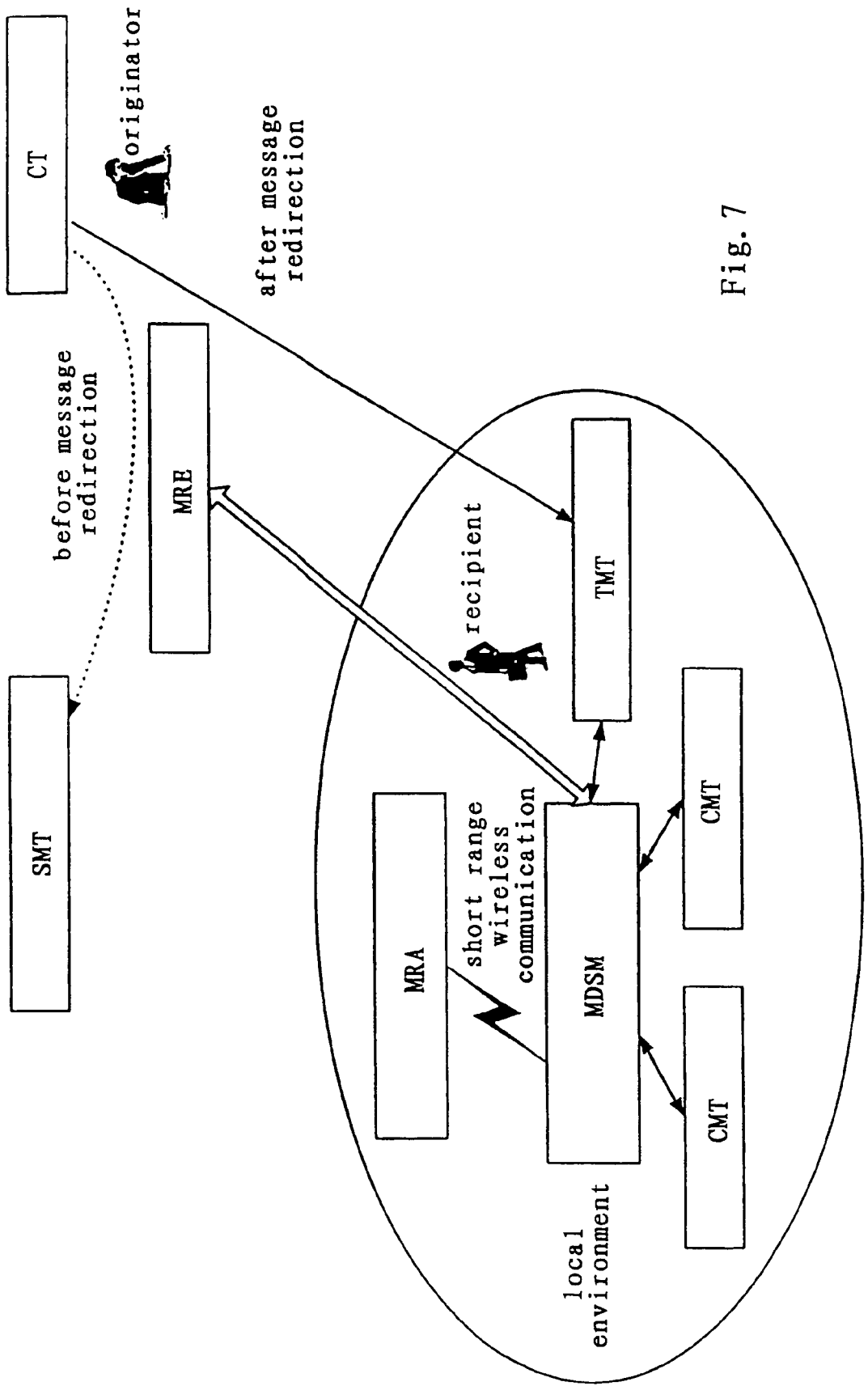
FIG. 7 illustrates a second example embodiment of the environment aware message delivery system according to the present invention.
Figure 8A:
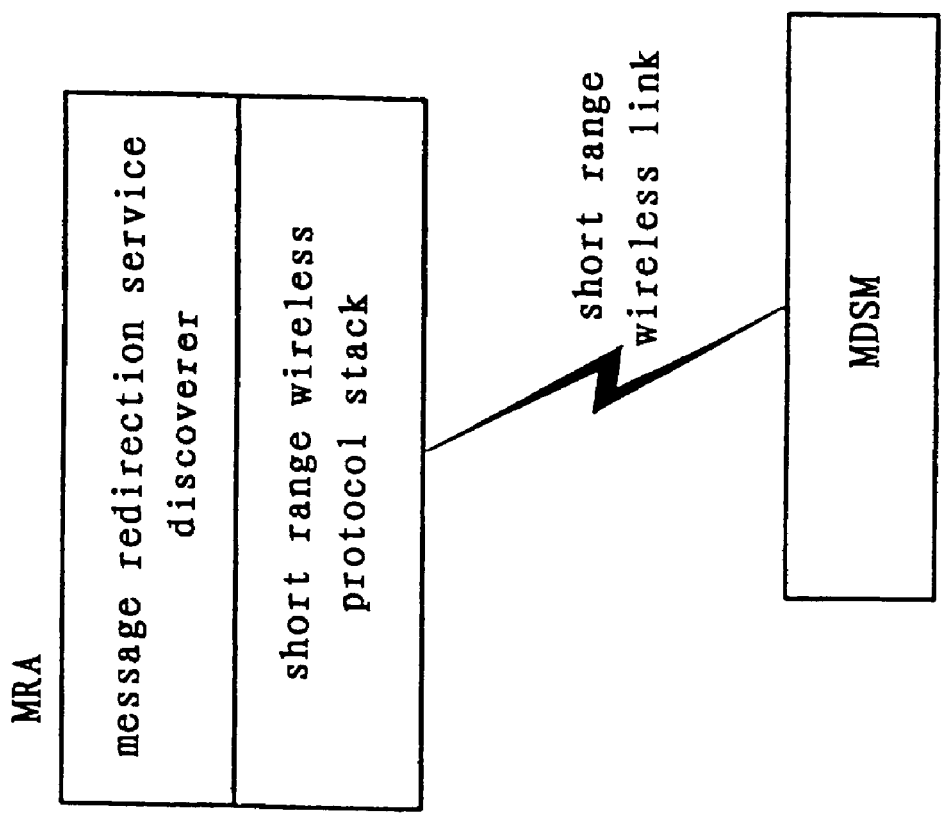
FIG. 8 illustrates an example of the message redirection agent (MRA) of FIG. 7.
Figure 8B:
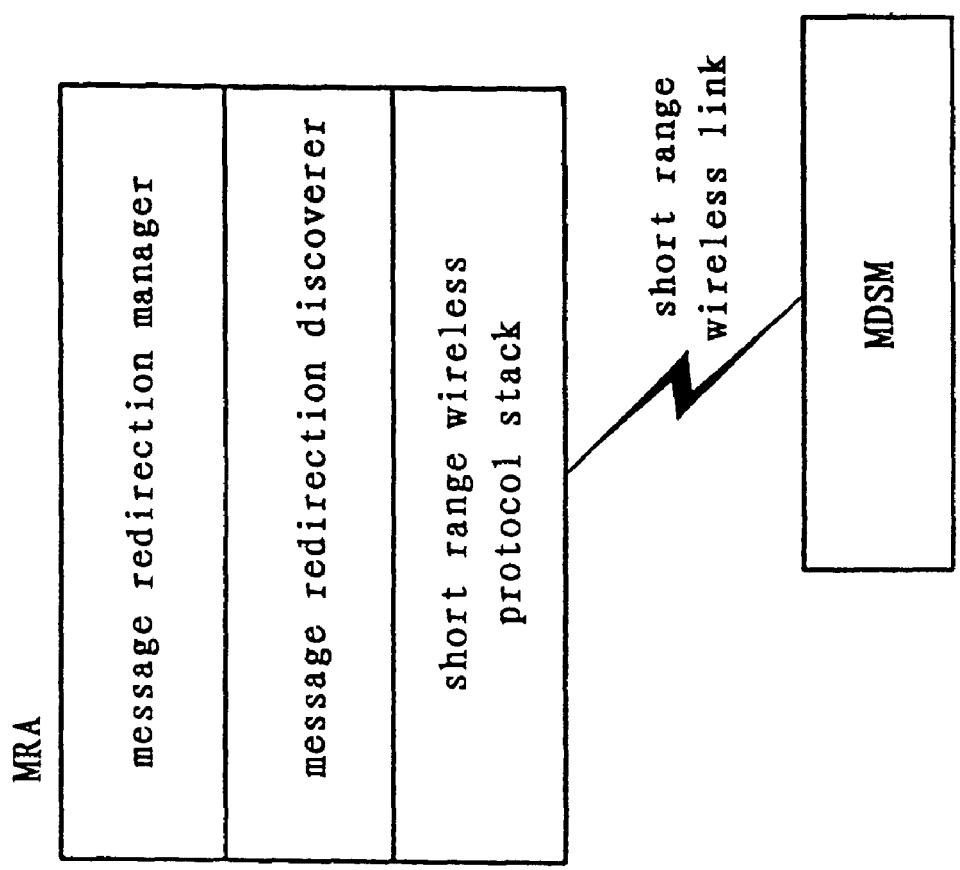
Figure 9:
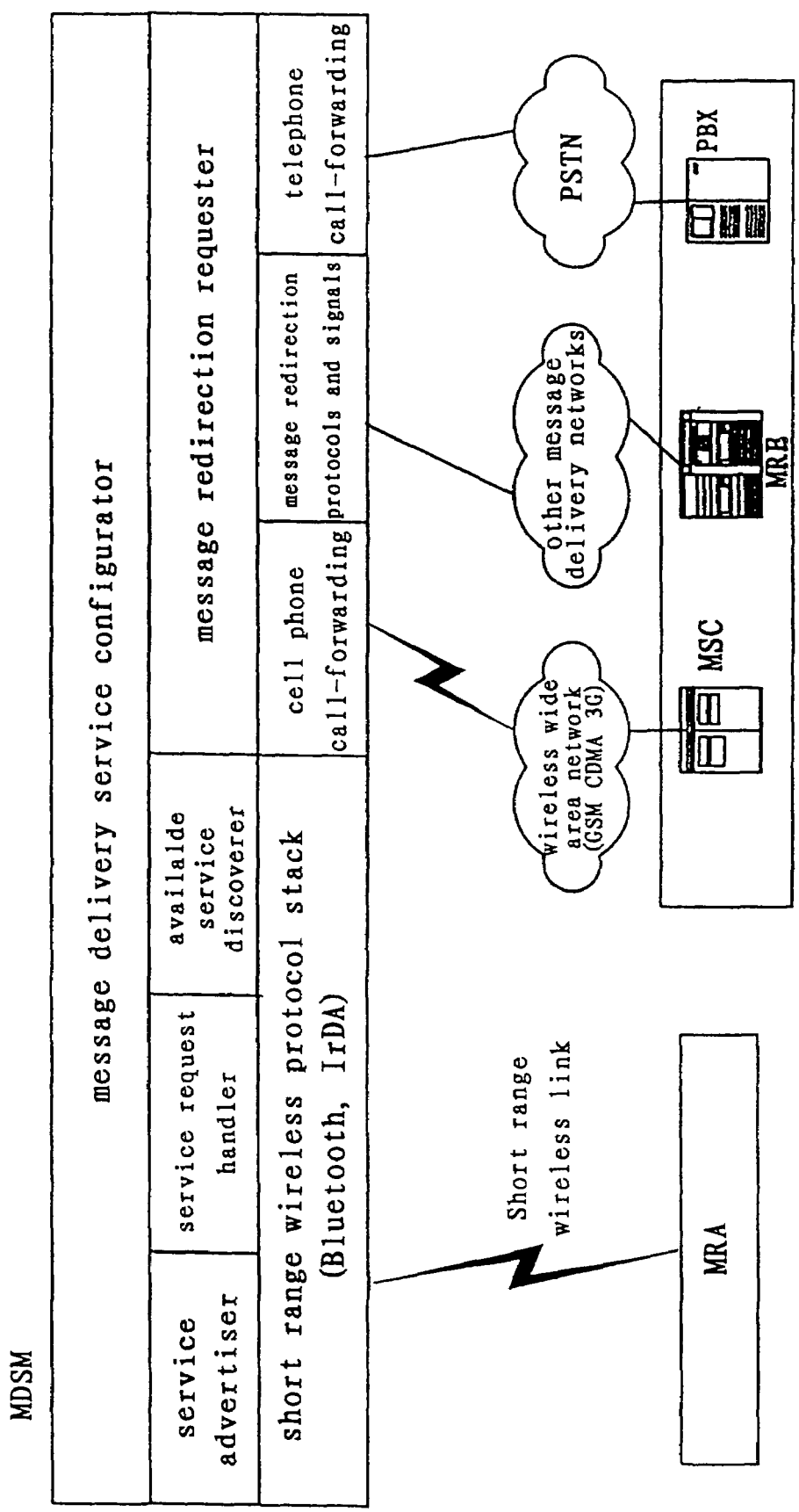
FIG. 9 illustrates an example of the message delivery services manager (MDSM) of FIG. 7.

FIG. 7 illustrates a second embodiment of the environment aware message delivery system of the present invention which delivers message for users automatically. The differences between the system of FIG. 7 and that of FIG. 1 lie in that in the system of FIG. 7 the MDSM requests the MRE for message redirection service. In this embodiment, as shown in FIG. 9, the message delivery service manager MDSM includes also a message redirection requester. With such a configuration, if the target message terminal TMT is selected by the MDSM, as shown in FIG. 8A, the MRA can be simplified only to be composed of a message redirection service discoverer. Furthermore, the message redirection service discoverer is used only for sending service request to MDSM and there is no need to use it to receive the service information from the MDSM. Meanwhile, there is no need for the MDSM to send service information to the MRA. If the target message terminal TMT is selected by the MRA, as shown in FIG. 8B, the MRA comprises a message redirection service discoverer and a message redirection manager.

It would be by no means difficult for one skilled in the art, based on the above teaching, to gain the implementations of the second embodiment of the environment aware message delivery system of the invention as shown in FIG. 7 with regard to the cell phone and telephone call-forwarding as well as the processing steps of the system. For the sake of conciseness, a detailed description thereabout is omitted hereafter.

Figure 10:
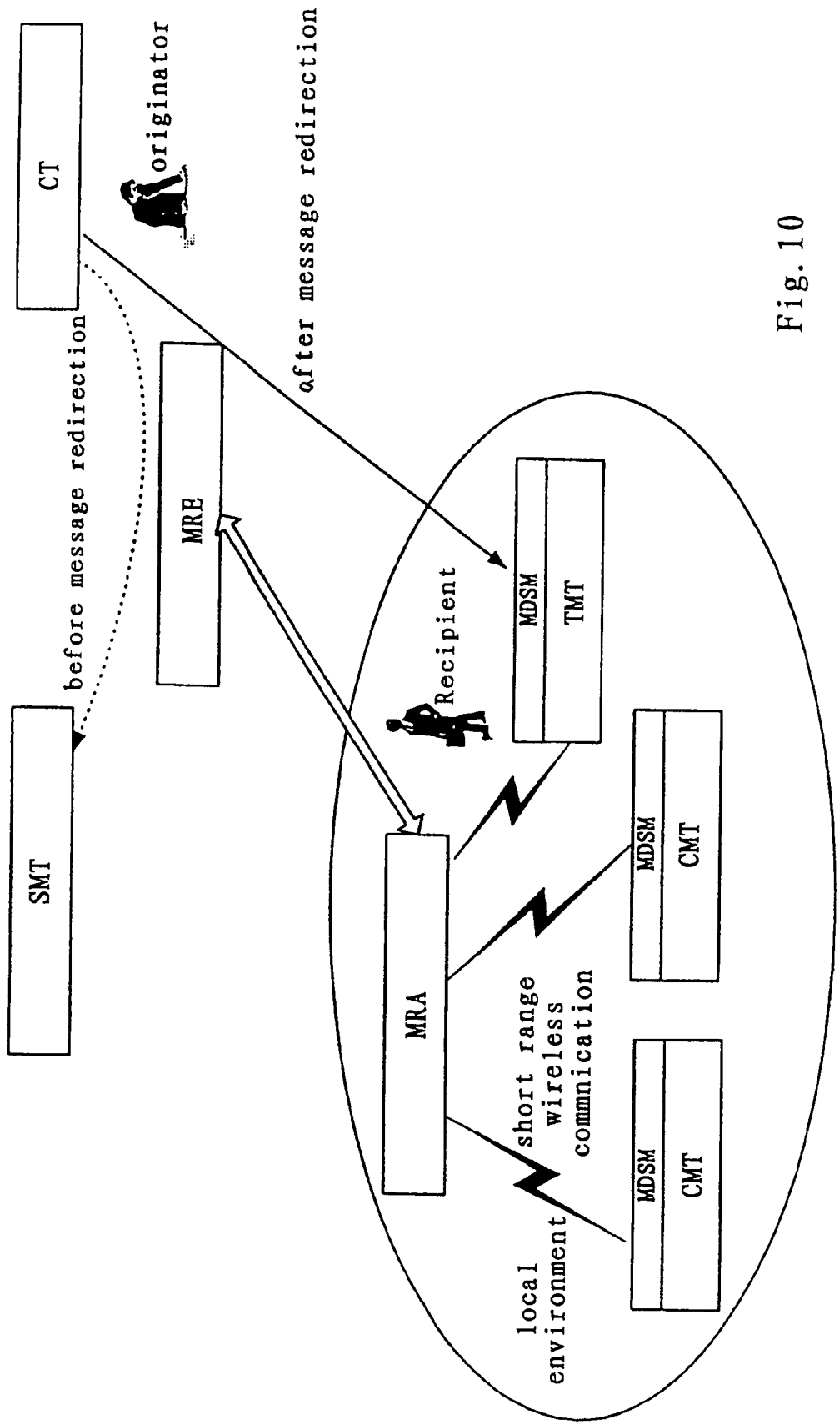
FIG. 10 illustrates a third example embodiment of the environment aware message delivery system according to the present invention.
Figure 11:
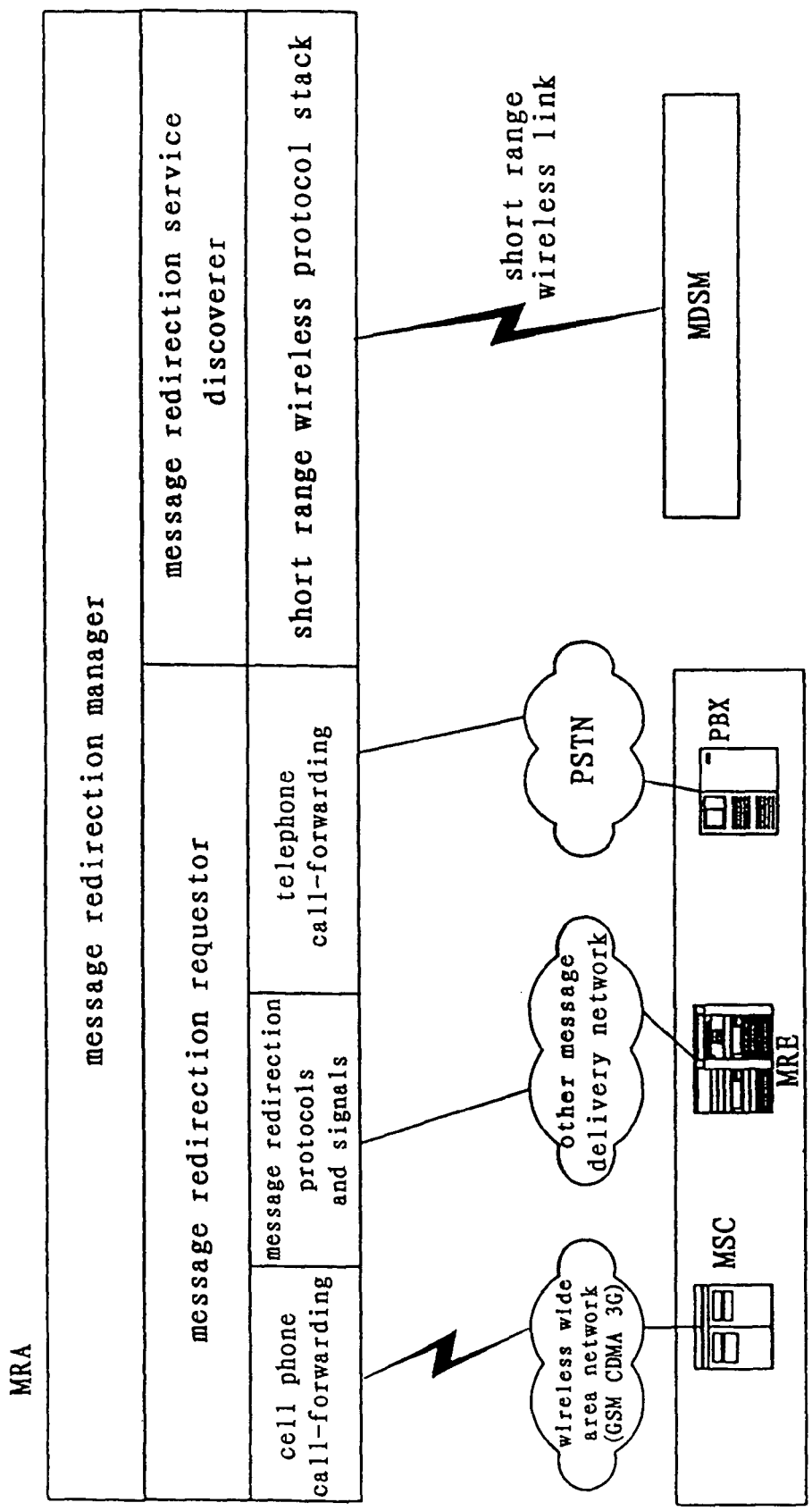
FIG. 11 illustrates an example of the message redirection agent (MRA) of FIG. 10.
Figure 12:
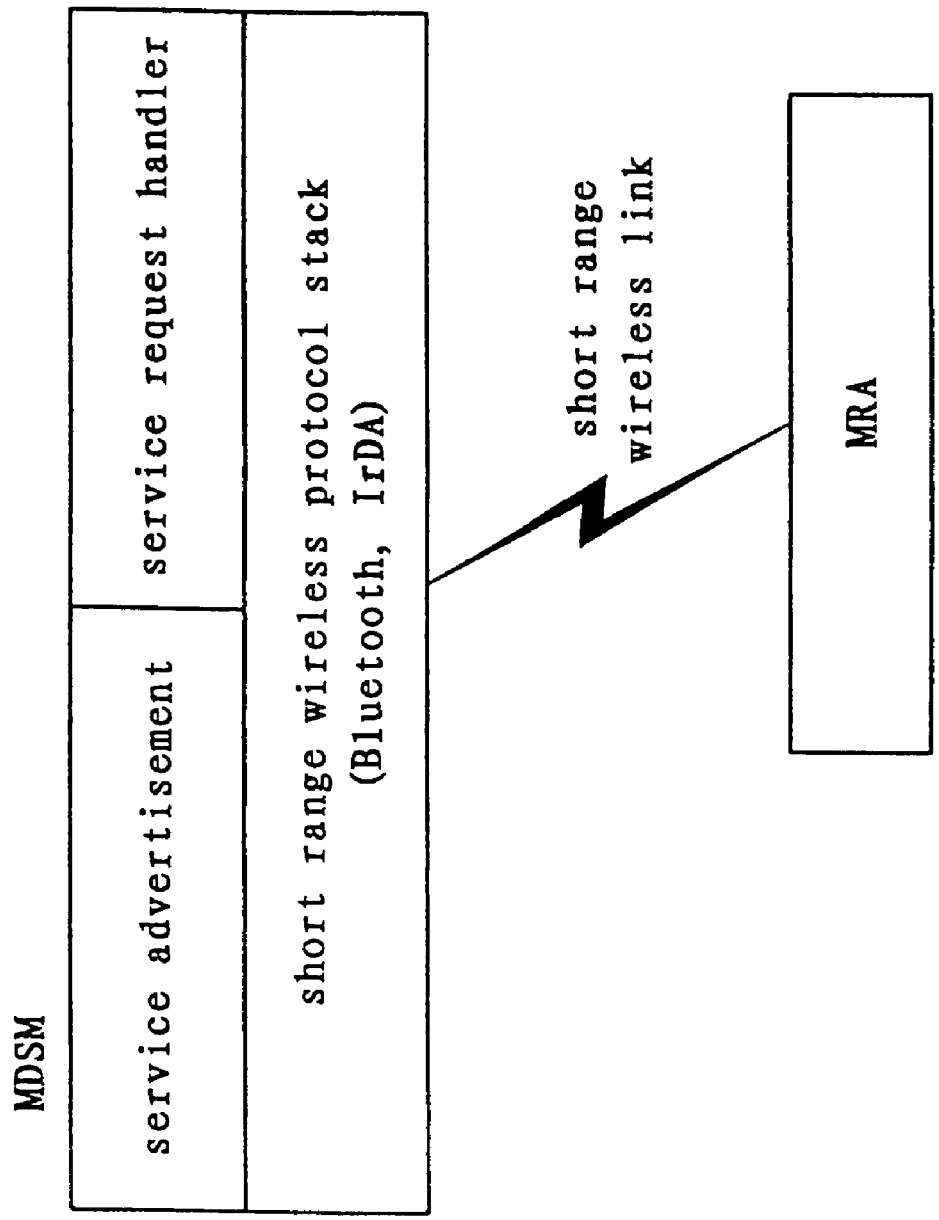
FIG. 12 illustrates an example of the message delivery services manager (MDSM) of FIG. 10.

FIG. 10 illustrates a third embodiment of the environment aware message delivery system of the present invention which delivers message for users automatically. As shown in FIG. 10, the system comprises a plurality of MDSMs that run on the message terminals respectively, wherein the message terminals may be intelligent terminals that can possibly conduct short range wireless communication with the MRA and are able to process the request from the MRA. Referring to FIG. 11 and FIG. 12, a simplification is made so that the MDSM comprises merely of a service request handler and a service advertiser (optionally) and the MRA comprises a message redirection discoverer, a message redirection manager and a message redirection requester.

It would be by no means difficult for those skilled in the art, based on the above contents, to gain the implementations of the third embodiment of the environment aware message delivery system of the invention as shown in FIG. 10, with regard to the cell phone and telephone call-forwarding as well as the processing steps of the system. For the sake of conciseness, a detailed description thereabout is omitted hereafter.

Figure 13:
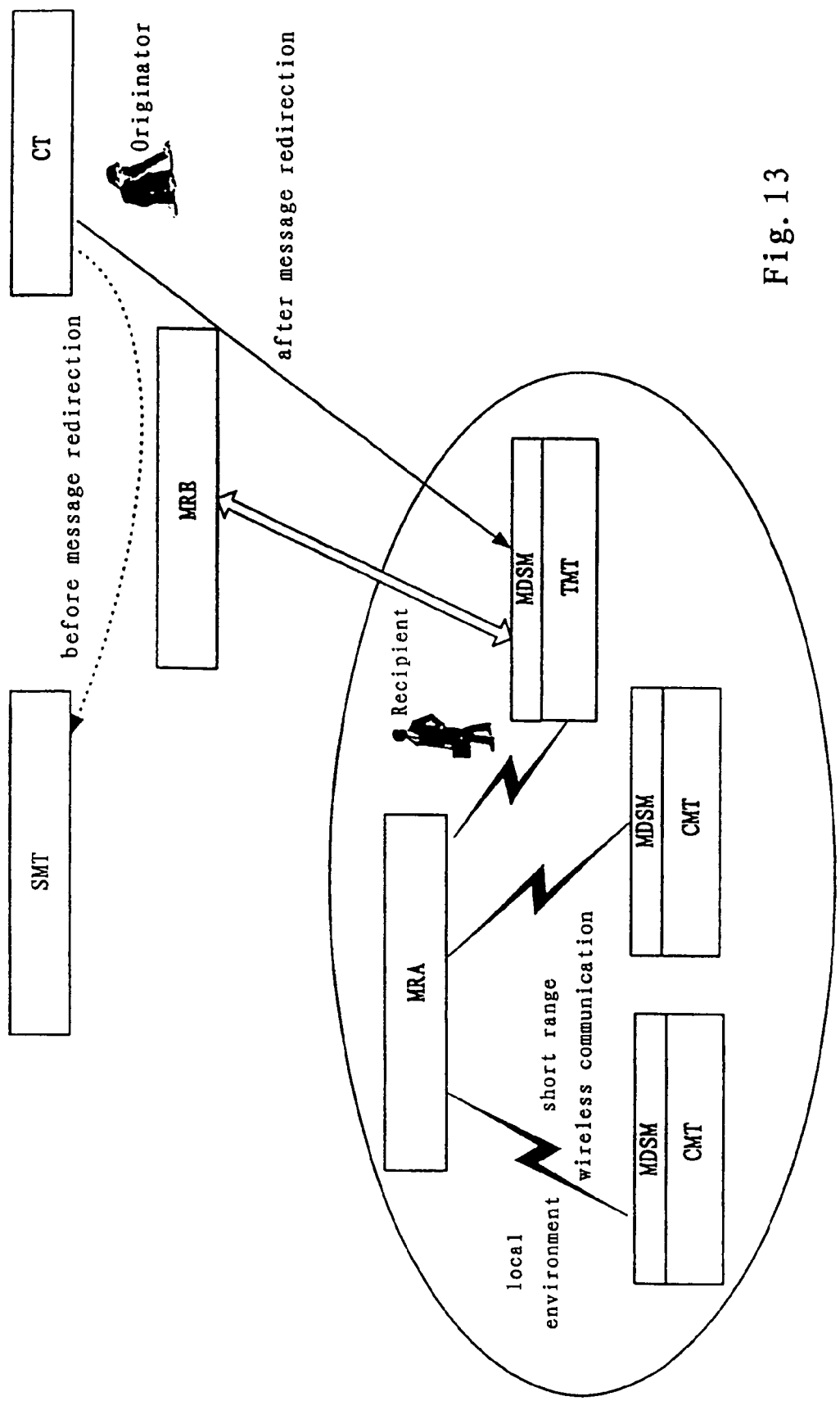
FIG. 13 illustrates a fourth example embodiment of the environment aware message delivery system according to the present invention.
Figure 14:
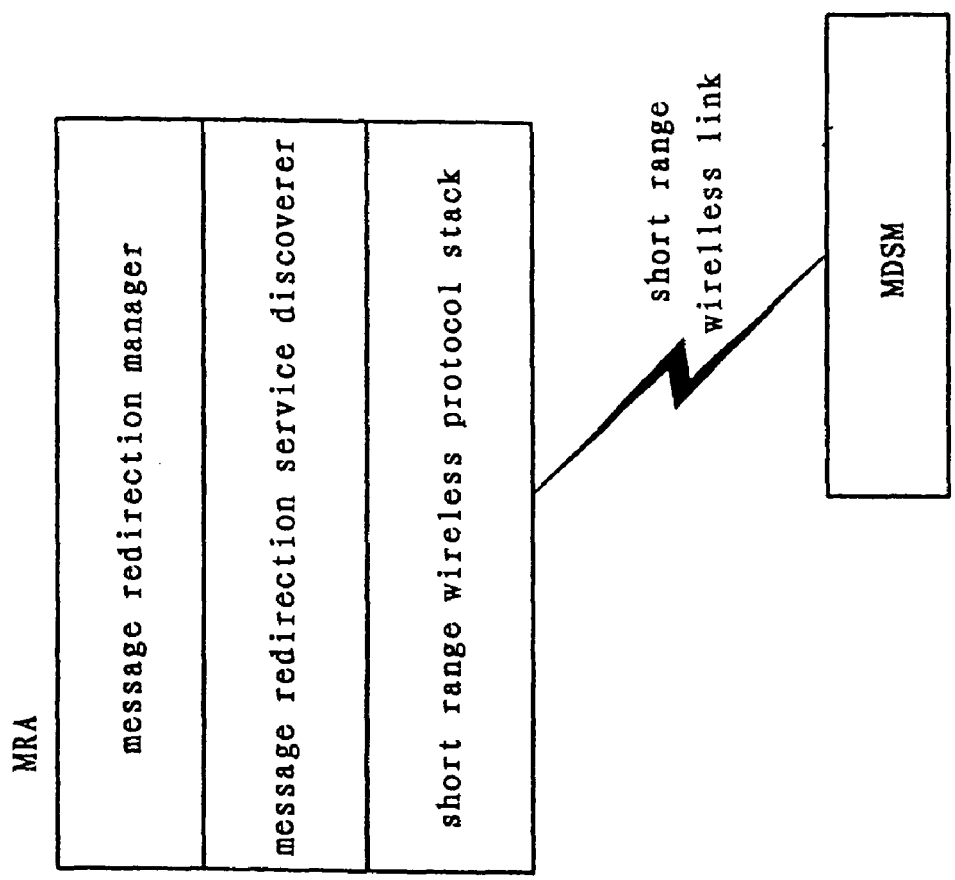
FIG. 14 illustrates an example of the message redirection agent (MRA) of FIG. 13.
Figure 15:
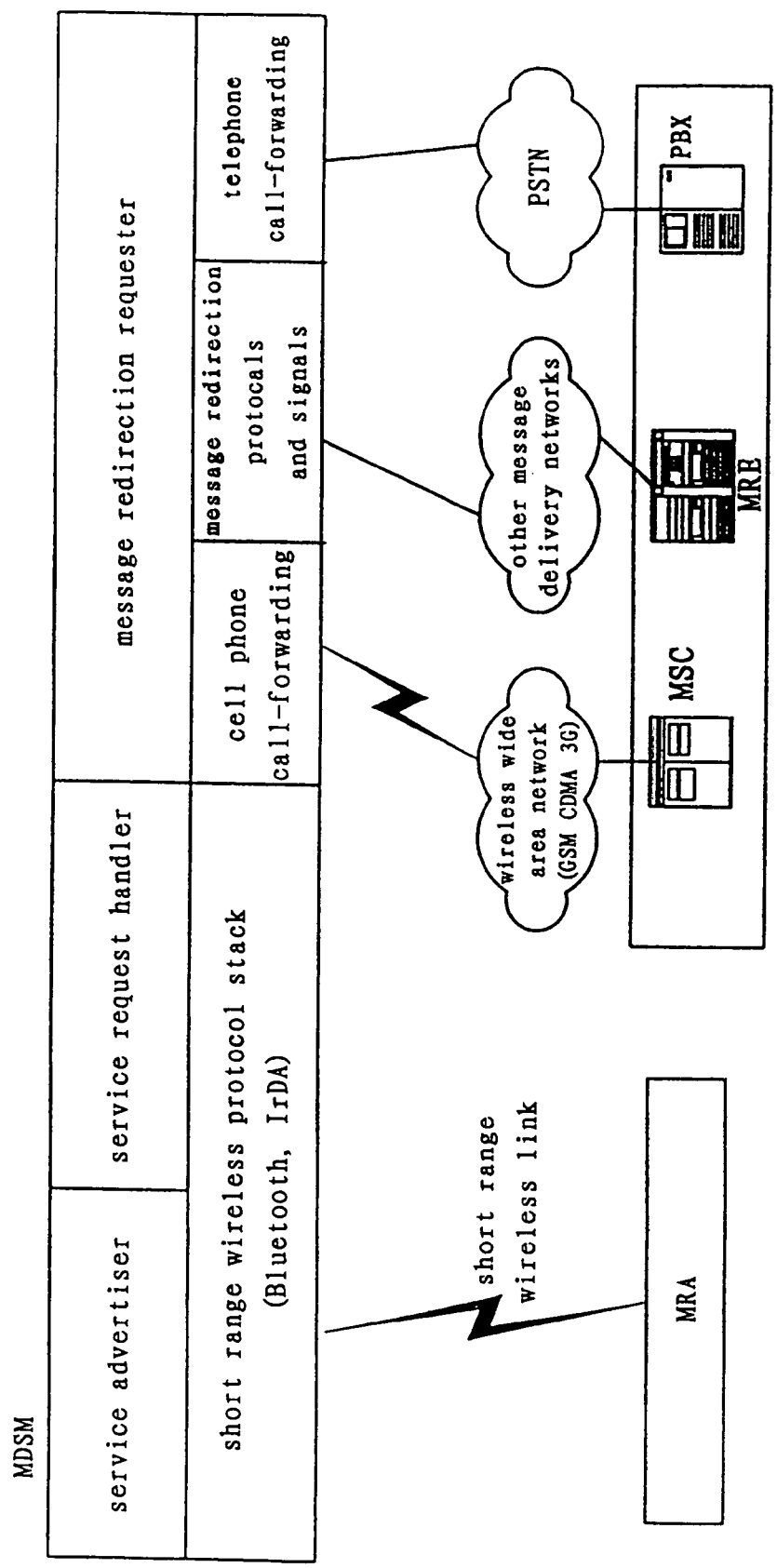
FIG. 15 illustrates an example of the message delivery services manager (MDSM) of FIG. 13.

FIG. 13 illustrates a fourth embodiment of the environment aware message delivery system of the present invention which delivers message for users automatically. The differences between the system of FIG. 13 and that of FIG. 10 lie in that in the system of FIG. 13 the target message terminal TMT requests the MRE for message redirection service. FIG. 14 and FIG. 15 show the components of the MRA and the MDSM under the architecture of FIG. 13. The MRA comprises a message redirection discoverer and a message redirection manager and the MDSM comprises a service request handler, a message redirection requester and a service advertiser (optionally).

It would be by no means difficult for those skilled in the art, based on the above contents, to gain the implementations of the fourth embodiment of the environment aware message delivery system of the invention as shown in FIG. 13 with regard to the cell phone and telephone call-forwarding as well as the processing steps of the system. For the sake of conciseness, a detailed description thereabout is omitted hereafter.

The above provides in detail, with reference to the drawings, the descriptions of the advantageous embodiments of the environment aware system and the method according to the present invention for delivering message automatically for users.

While the invention has been described by way of advantageous embodiments, the embodiments may be modified within the scope of the affixed claims without apart from the substantive spirit of the invention. It is obvious to the ordinary technicians of the art that the present invention possesses other examples and embodiments in spite that the above discussion about the advantageous embodiments of the invention are given on the examples of delivering message for cell phone users and fixed phone users.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. An environment aware message delivery system, comprising:

a portable message redirection agent carried by a user; and a message delivery service manager for managing candidate message terminals to provide message delivery services for the user, wherein when the user moving over to a place, said message redirection agent cooperates with said message delivery service manager located in the environment around the user to select a message terminal from a candidate message terminals in the environment as a target message terminal, and request a message redirection entity to redirect the message addressed to the user to the target message terminal, wherein said message redirection agent comprises:

a message redirection service discoverer for sending service requests to said message delivery service manager, and receiving service information from said message delivery service manager;

a message redirection manager for maintaining a message redirection service list, configuring message redirection policy and selecting the target message terminal; and a message redirection requester for requesting message redirection service from the message redirection entity; and wherein said message delivery service manager comprises:

a service request handler for authenticating the message redirection agent and sending service information on-demand to the message redirection agent;

a service availability detector for checking the status of the candidate message terminals in the environment and updating the message delivery service list according to the checking result; and a message delivery service configurator for configuring the available message delivery services, such as authorizing who can access these services.

2. A system according to claim 1, wherein said message delivery service manager further comprises a service advertiser for periodically sending service information to nearby message redirection agents.

3. A system according to claim 1, wherein said message redirection agent comprises a message redirection service discoverer for sending service requests to said message delivery service manager, and wherein said message delivery service manager comprises:

a service request handler for authenticating the message redirection agent;

a service availability detector for checking the status of the candidate message terminals in the environment and updating the message delivery service list according to the checking result;

a message delivery service configurator for configuring the available message delivery services, such as authorizing who can access these services, and selecting the target message terminal on behalf of the message redirection agent making the service requests; and a message redirection requester for requesting message redirection service from the message redirection entity.

4. An environment aware message delivery system comprising:

a portable message redirection agent carried by a user; and a message delivery service manager for managing candidate message terminals to provide message delivery services for the user, wherein when the user moving over to a place, said message redirection agent cooperates with said message delivery service manager located in the environment around the user to select a message terminal from candidate message terminals in the environment as a target message terminal, and request a message redirection entity to redirect the message addressed to the user to the target message terminal, wherein said message redirection agent comprises:
- a message redirection service discoverer for sending service requests to said message delivery service manager, and receiving service information from said message delivery service manager; and
- a message redirection manager for maintaining message redirection service list, configuring the message redirection policy and selecting the target message terminal.

5. A system according to claim 4, wherein said message delivery service manager comprises:
- a service request handler for authenticating the message redirection agent and sending service information on-demand to the message redirection agent;
- a service availability detector for checking the status of the candidate message terminals in the environment and updating the message delivery service list according to the checking result;
- a message delivery service configurator for configuring the available message delivery services, such as authorizing who can access these services; and
- a message redirection requester for requesting message redirection service from the message redirection entity according to the request of the message redirection agent.

6. A system according to claim 4, wherein said system comprises a plurality of message delivery service managers, running in various message terminals respectively.

7. A system according to claim 6, wherein said message redirection agent comprises:
- a message redirection service discoverer for sending service requests to said message delivery service manager, and receiving service information from said message delivery service manager;
- a message redirection manager for maintaining message redirection service list, configuring the message redirection policy and selecting the target message terminal; and
- a message redirection requester for requesting message redirection service from the message redirection entity.

8. A system according to claim 7, wherein said message delivery service manager comprises a service request handler for authenticating the message redirection agent and sending service information on-demand to the message redirection agent.

9. A system according to claim 8, wherein said message delivery service manager further comprises a service advertiser for periodically sending message redirection service information to nearby message redirection agents.

10. A system according to claim 6, wherein said message redirection agent comprises:
- a message redirection service discoverer for sending service requests to said message delivery service manager, and receiving service information from said message delivery service manager; and
- a message redirection manager for maintaining message redirection service list, configuring the message redirection policy and selecting the target message terminal.

11. A system according to claim 1, wherein said system comprises a plurality of message delivery service managers, running in various message terminals respectively, and wherein a message delivery service manager comprises:
- a service request handler for authenticating the message redirection agent and sending service information on-demand to the message redirection agent; and
- a message redirection requester for requesting message redirection service from the message redirection entity according to the request of the message redirection agent.

* * * * *